United States Patent
Duhamel et al.

(10) Patent No.: US 11,584,022 B2
(45) Date of Patent: Feb. 21, 2023

(54) MONOBLOCK FINGER FOR GRIPPER MECHANISM

(71) Applicant: KINOVA INC., Boisbriand (CA)

(72) Inventors: Jean-Christophe Duhamel, Boisbriand (CA); Jonathan Lussier, Boisbriand (CA); Mathiew Moineau-Dionne, Boisbriand (CA); Alexandre Picard, Boisbriand (CA)

(73) Assignee: KINOVA INC., Boisbriand (CA)

( * ) Notice: Subject to any disclaimer, the term of this patent is extended or adjusted under 35 U.S.C. 154(b) by 34 days.

(21) Appl. No.: 16/875,672

(22) Filed: May 15, 2020

(65) Prior Publication Data

US 2020/0361096 A1    Nov. 19, 2020

Related U.S. Application Data (60) Provisional application No. 62/849,380, filed on May 17, 2019.

(51) Int. Cl.
    *B25J 15/00* (2006.01)
    *B25J 15/08* (2006.01)
(52) U.S. Cl.
    CPC ........... *B25J 15/0009* (2013.01); *B25J 15/08* (2013.01)
(58) Field of Classification Search
    CPC .... B25J 15/0009; B25J 15/0004; B25J 15/08; B25J 15/083; B25J 15/12
    USPC ................................................. 294/106, 213
    See application file for complete search history.

(56) References Cited

U.S. PATENT DOCUMENTS

| | | | | |
|---|---|---|---|---|
| 3,370,213 A | * | 2/1968 | Rose .................... | B25J 15/0266 318/513 |
| 3,927,424 A | * | 12/1975 | Itoh ........................ | B25J 15/022 623/63 |
| 4,114,464 A | * | 9/1978 | Schubert .............. | B25J 15/0213 623/64 |
| 4,377,305 A | * | 3/1983 | Horvath .................. | A61F 2/588 294/106 |
| 5,280,981 A | * | 1/1994 | Schulz .................... | B25J 15/103 294/106 |
| 5,588,688 A | * | 12/1996 | Jacobsen .............. | B25J 15/0266 294/106 |
| 6,217,094 B1 | * | 4/2001 | Hanaduka ............ | B25J 15/0213 901/46 |
| 8,534,729 B2 | * | 9/2013 | Wilkinson ............... | B25J 15/08 901/34 |
| 9,545,727 B1 | * | 1/2017 | Shamlian ............. | B25J 15/0009 |

(Continued)

*Primary Examiner* — Paul T Chin
(74) *Attorney, Agent, or Firm* — Norton Rose Fulbright Canada LLP (57) ABSTRACT

A mechanical finger for a mechanical hand, has: a proximal phalanx pivotably mountable to a support of the mechanical hand to pivot relative to the support about a finger pivot axis; a distal phalanx pivotably connected to the proximal phalanx via a first living hinge to pivot relative to the proximal phalanx about a first pivot axis; and a skeleton member pivotably connected at one end to the distal phalanx via a second living hinge to pivot relative to the distal phalanx about a second pivot axis offset from the first pivot axis and at another end operatively connected to an actuator of the mechanical hand to be selectively movable by the actuator to pivot the distal phalanx relative to the proximal phalanx and to pivot the distal phalanx relative to the support when the finger is in use.

20 Claims, 9 Drawing Sheets

(56) References Cited

U.S. PATENT DOCUMENTS

| | | | | |
|---|---|---|---|---|
| 9,718,195 | B1* | 8/2017 | Youmans | B25J 15/0213 |
| 9,782,902 | B1* | 10/2017 | Kim | B25J 15/0009 |
| 10,016,901 | B2* | 7/2018 | Strauss | B25J 13/085 |
| 10,259,122 | B2* | 4/2019 | Odhner | B25J 15/022 |
| 2011/0148132 | A1* | 6/2011 | Park | B25J 15/10 |
| | | | | 294/106 |
| 2013/0057004 | A1* | 3/2013 | Murata | B25J 15/0009 |
| | | | | 294/106 |
| 2013/0090761 | A1* | 4/2013 | Sejimo | H02P 27/08 |
| | | | | 318/434 |
| 2014/0021731 | A1* | 1/2014 | Gao | B25J 15/0213 |
| | | | | 294/198 |
| 2017/0252930 | A1* | 9/2017 | Birglen | B25J 15/0206 |
| 2018/0264660 | A1* | 9/2018 | Bergeron | G01L 5/228 |
| 2020/0276718 | A1* | 9/2020 | Bellandi | B25J 15/0266 |

* cited by examiner

*FIGURE 9A* though on a single side view of the finger 10 in FIG. 1.

MONOBLOCK FINGER FOR GRIPPER MECHANISM

CROSS-REFERENCE TO RELATED APPLICATIONS

This application claims priority from U.S. patent application 62/849,380 filed on May 17, 2019. Its content is incorporated herewith in its entirety.

TECHNICAL FIELD

The present disclosure generally relates to the field of robotics. More specifically, the present disclosure relates to robotic arms having grippers, and to finger construction of such grippers.

BACKGROUND OF THE ART

Assistive robotic arms for handicapped people are commonly used. They bring autonomy for the user, enabling them to perform tasks such as, for example, grasping a bottle of water, opening a door, handling the TV remote, etc. without the help of another person.

Because they are used on a daily basis, indoors and outdoors, for multiple tasks, the gripper and the fingers located at the end of the assistive robotic arm are frequently exposed to humidity, water, dust, etc. and can therefore be damaged. Prior art grippers that adapt to the geometry of the object being grasped contain numerous parts. While suitable for their intended purposes, at least some such prior art grippers may be complex and costly when they need to be cleaned, repaired or replaced in at least some applications. In order to have them "weather proofed", prior art devices are typically covered with a rubber or similar material glove that may wear with time and may impact the weather proofing and/or grasping performance.

SUMMARY

In one aspect, there is provided a mechanical finger for a mechanical hand, comprising: a proximal phalanx pivotably mountable to a support of the mechanical hand to pivot relative to the support about a finger pivot axis; a distal phalanx pivotably connected to the proximal phalanx via a first living hinge to pivot relative to the proximal phalanx about a first pivot axis; and a skeleton member pivotably connected at one end to the distal phalanx via a second living hinge to pivot relative to the distal phalanx about a second pivot axis offset from the first pivot axis and at another end operatively connected to an actuator of the mechanical hand to be selectively movable by the actuator to pivot the distal phalanx relative to the proximal phalanx and to pivot the distal phalanx relative to the support when the finger is in use.

In another aspect, there is provided a mechanical gripper comprising: a support; at least one mechanical finger movable relative to the support from an open position to a closed position, the at least one mechanical finger having a proximal phalanx pivotably mounted to the support about a finger pivot axis, a distal phalanx pivotably connected to the proximal phalanx via a first hinge, and a skeleton member pivotably connected at a first end to the distal phalanx via a second hinge offset from the first hinge; and an actuator operatively connected to a second opposite end of the skeleton member, movement of the second opposite end of the skeleton member by the actuator in a direction being transverse to the finger pivot axis moving the mechanical finger between the open position and the closed position.

Many further features and combinations thereof concerning the present improvements will appear to those skilled in the art following a reading of the instant disclosure.

DETAILED DESCRIPTION

Figure 1:
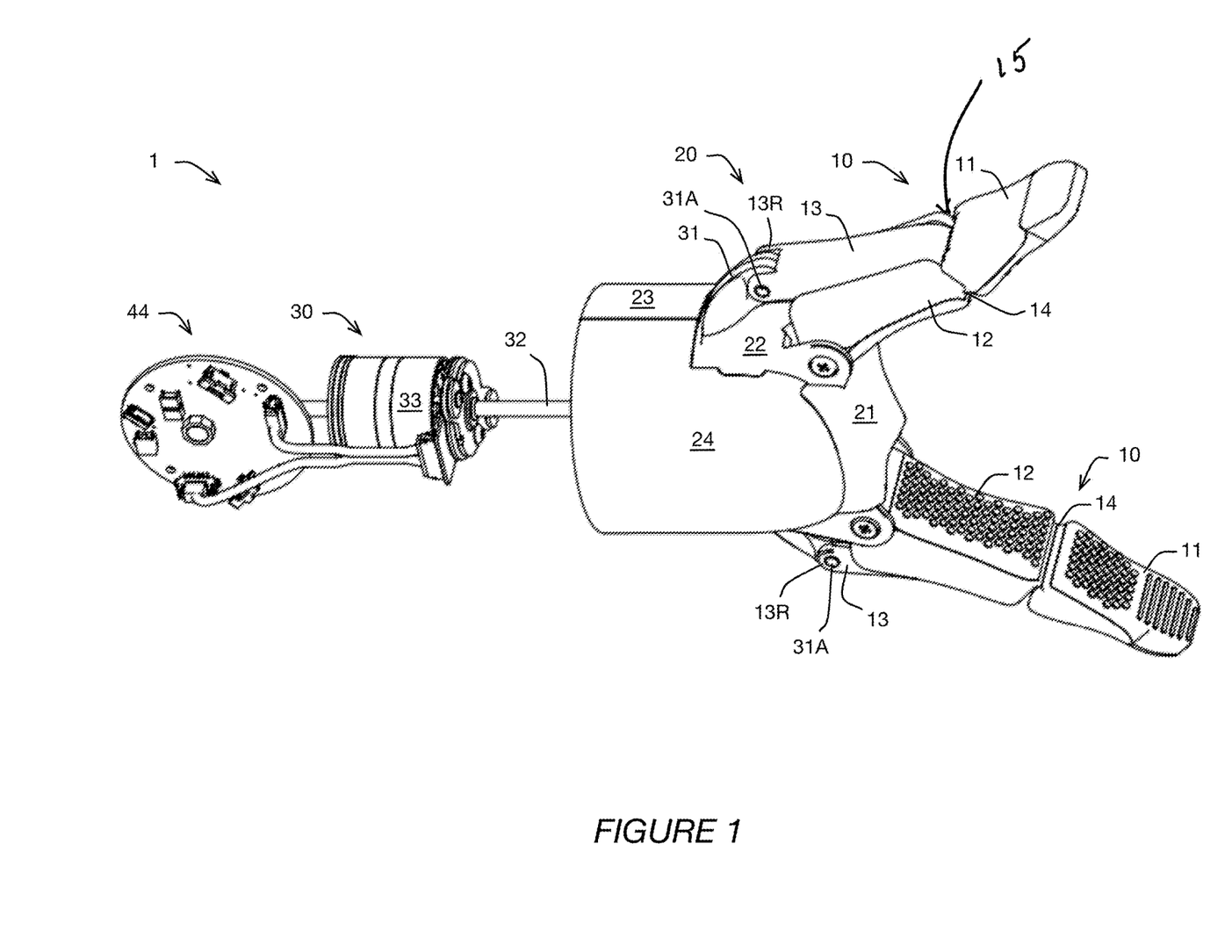
FIG. 1 is a three dimensional view of an end of a mechanical arm with a gripper in accordance with one embodiment shown partly disassembled to show some of its internal components.
Figure 2:
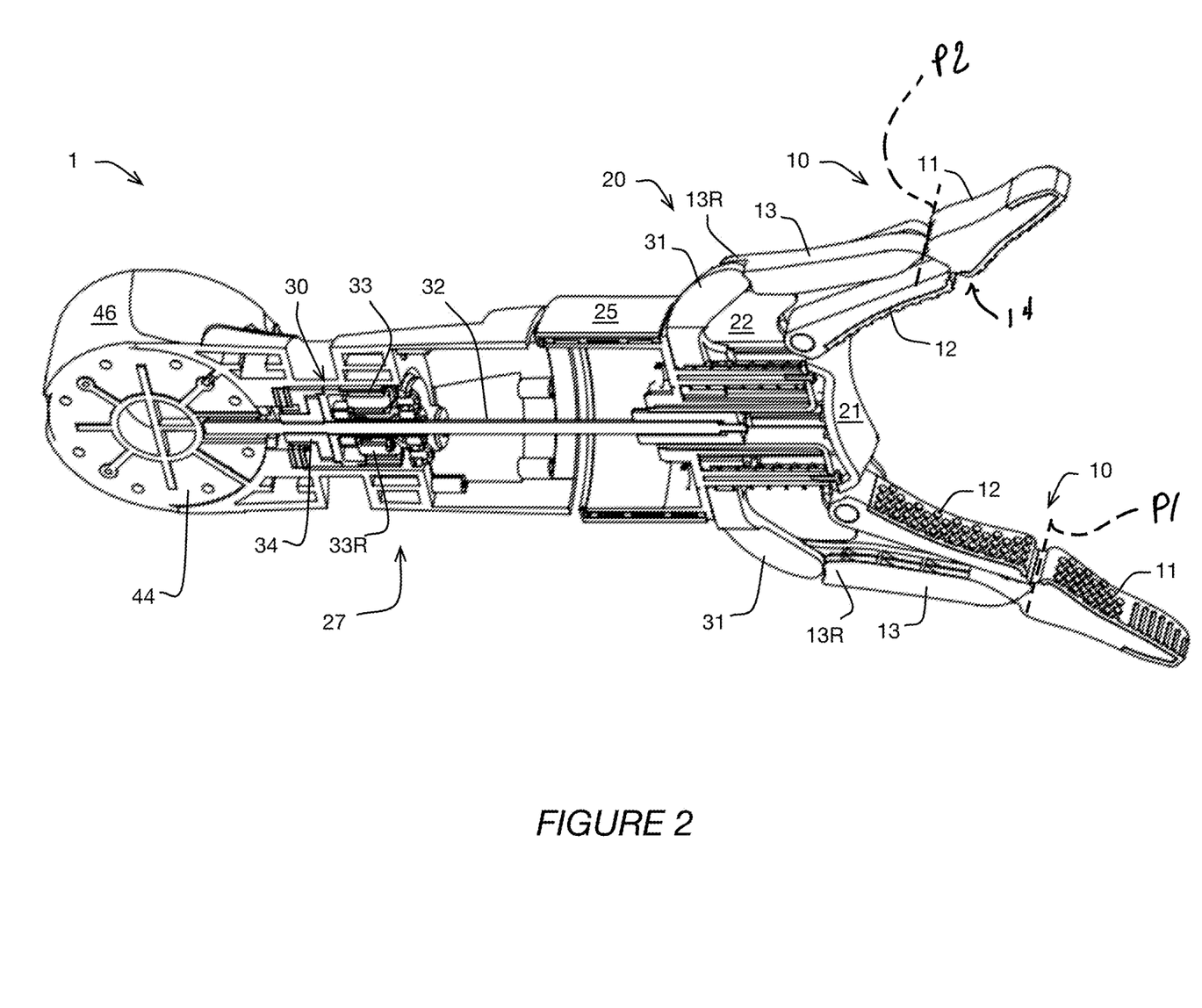
FIG. 2 is a three dimensional cutaway view of the mechanical arm of FIG. 1.

Referring to FIGS. 1 and 2, an end effector end of a mechanical arm constructed in accordance with a non-limiting example embodiment is shown generally at 1. The mechanical arm 1 has a gripper 20 at its end effector end. As will be described herein below, the gripper 20 is used to allow a user to grasp and pinch objects.

In the embodiment shown, the gripper 20 includes two opposed movable and articulated mechanical fingers 10. In this two-finger arrangement, the opposed movable mechanical fingers 10 may be mirror images of each other relative to a symmetry plane A (FIG. 6) of the gripper 20. It will be appreciated that, alternatively, this need not be the case and/or a different number of fingers 10 could be used, such as a single finger or more than two. As an example, in some embodiments, one or more non-actuated fingers may be used, with an opposing one or more fingers according to the present embodiment which may be movable toward the non-actuated finger(s). As another example, in some embodiments, the finger(s) 10 may be constructed to also translate in parallel toward each other when actuated, in addition to or instead of the pinching and/or closing movements shown and described herein.

In the present embodiment, each of the fingers 10 includes a distal phalanx 11 flexibly connected to a proximal phalanx 12 via an inner living hinge 14, and a skeleton member 13 flexibly connected to the distal phalanx 11 via an outer living hinge 15. The inner living hinge 14 defines an inner pivot axis P1 between the distal phalanx 11 and the proximal phalanx 12. The outer living hinge 15 defines an outer pivot axis P2 between the skeleton member 13 and the distal phalanx 11. The inner and outer pivot axes P1, P2 are shown herein as being parallel to one another but offset from one another. Here, the term "living hinge" means a flexible hinge (flexure bearing, flexure hinge) that flexibly connects two or more portions, with the pivoting being facilitated by the hinge being made thinner than the pieces it connects, for example. Stated differently, in the embodiment shown, the distal phalanx 11, the proximal phalanx 12, the inner living hinge 14, and the outer living hinge 15 may be a monoblock, also referred to as monolithic, component, with thinner flexible portions. It is contemplated to interconnect two monoblocks to form the finger 10, for example.

Here, the term "inner" means that the inner living hinge 14 is disposed on an inner side of the respective finger 10 and is closer to the symmetry plane A than the "outer" living hinge 15. In other embodiments, the mechanical arm 1 may include a different number of movable fingers 10, such as a single movable finger 10 or more than two movable fingers 10 for example. For the purposes of this document, the terms "distal" and "proximal" are relative to each other.

That is, a "distal phalanx" of a finger merely means that it is farther away from a point of attachment of the finger than a "proximal phalanx" of that finger. The "distal phalanx" of that finger need not be the last phalanx that defines an end of the finger. Similarly, the "proximal phalanx" of that finger need not be the proximal phalanx of that finger that defines the point of attachment of the finger. For the purposes of this document, the term "living hinge" is used as per its meaning known in the art.

Figure 4:
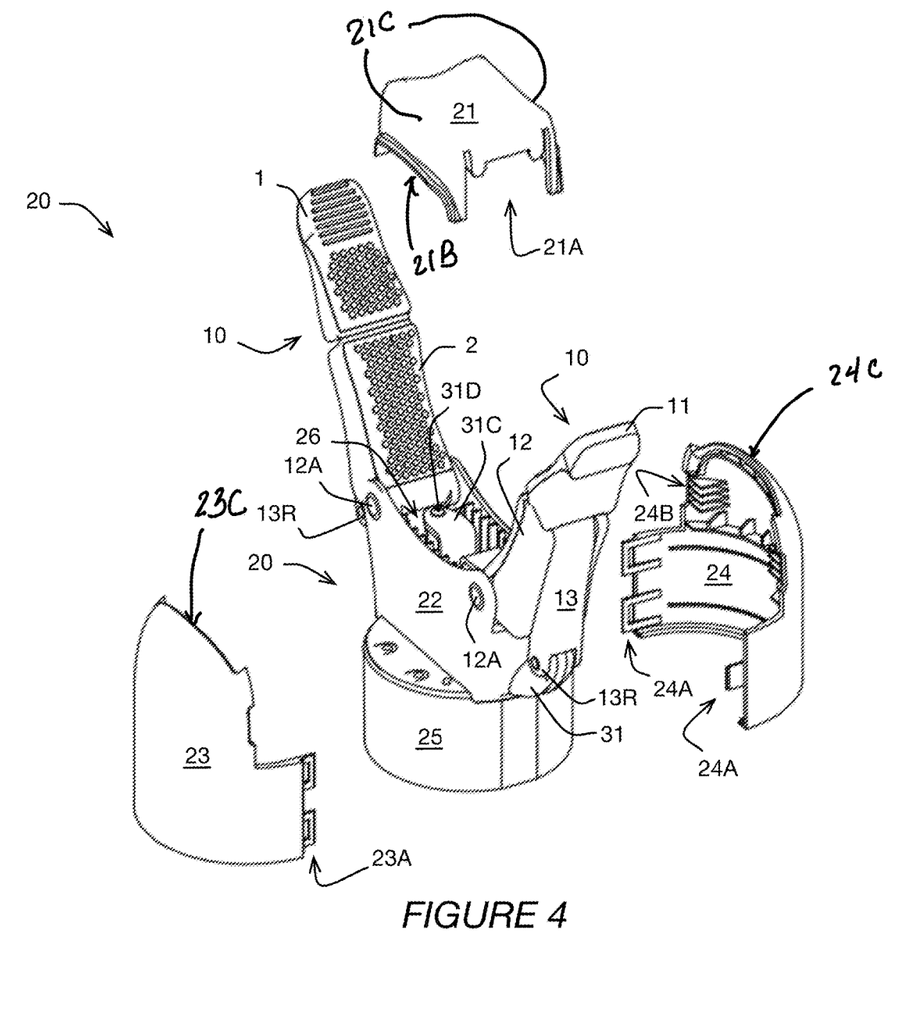
FIG. 4 is a three dimensional partially exploded view of a gripper of the mechanical arm of FIG. 1.
Figure 5:
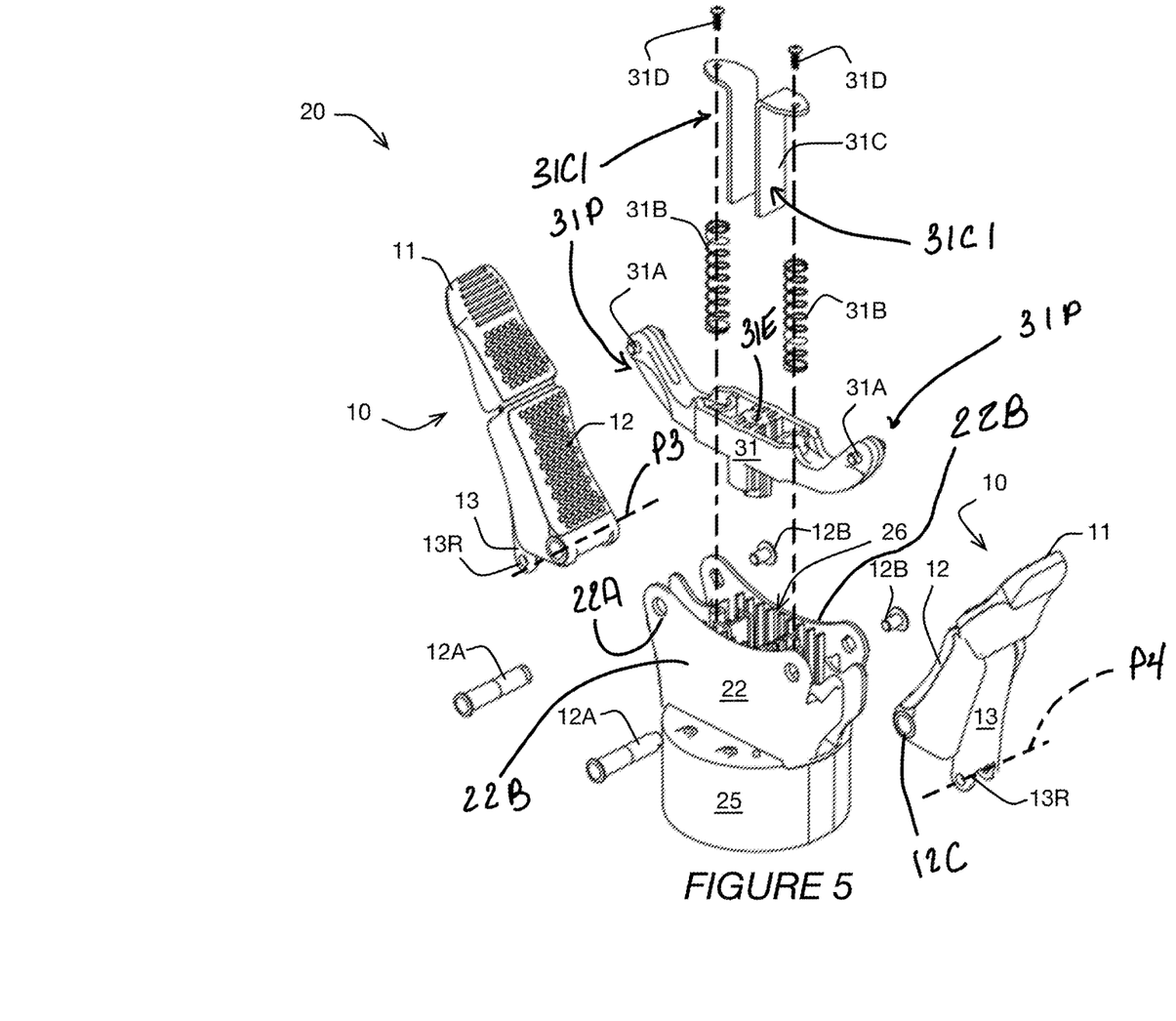
FIG. 5 is another partially exploded view of the gripper of the mechanical arm of FIG. 1.

Referring to FIGS. 2 and 4-5, in the embodiment shown, the gripper 20 includes a support or hand 22 that connects to a base 25, with the base 25 connecting to a wrist 27. Each of the proximal phalanges 12 of the fingers 10 is pivotably connected to a front part of the support 22 via a respective bolt 12A and nut 12B received in a respective aperture 22A defined in the support 22 and aperture 12C defined at a proximal end of the proximal phalanx 12. The support 22 may be a pair of spaced apart plates, as shown. Each bolt 12A and corresponding nut 12B are an example of a removable fastener via which a respective one of the proximal phalanges 12 may be pivotably connected to the support 22. Other suitable fastener(s), and other suitable pivotable attachments, may also be used, such a rivet, screw, plain pivot, etc. The proximal phalanges 12 of the fingers 10 are pivotable relative to the support 22 about respective finger pivot axes P3.

Referring more particularly to FIG. 4, a removable clip-on palm 21 and two removable clip-on hand covers 23, 24 are attached to and at least partially cover/shield the support 22 and its contents, as well as the base 25, from outside elements, such as water, mist and dirt, to which the gripper 20 may be exposed when in use. In other embodiments, a different cover/shield arrangement may be used. The clip-on palm 21 is disposed between the fingers 10 and has a concave top surface to assist in gripping round objects. A different shape of the palm 21 may be used to assist in gripping other shapes of objects. In some embodiments, the palm 21 may be omitted.

Each of the clip-on hand covers 23, 24 include attachment features 23A, 24A which in the present embodiment include corresponding clips or like corresponding connection features removably engageable with each other to secure the clip-on hand covers 23, 24 on the support 22 and the base 25. To this end, the clip-on hand covers 23, 24 further include protrusions (e.g. protrusions 24B) that engage portions of the support 22 and the base 25 so that the clip-on hand covers 23, 24 are less prone to be accidentally removed from the support 22 and the base 25 while the attachment features 23A, 24A are removably engaged with each other. The palm 21 also has attachment features 21A which are shaped to removably clip-on to the hand covers 23, 24 to secure the palm 21 thereto.

More specifically, and as shown in FIG. 4, the clip-on palm 21 defines two ledges 21B each protruding from a respective one of two opposed side walls 21C. These two ledges 21B are in abutment with top edges 23C, 24C of the clip-on hand covers 23, 24 such that movements of the clip-on palm 21 in a direction extending away from both of the hand covers 23, 24 is limited by the cooperation of the two ledges 21B, and the top edges 23C, 24C of the clip-on hand covers 23, 24.

Accordingly, in the present embodiment, installing the palm 21 and the covers 23, 24 onto the support 22 does not require any fasteners. This may reduce the number of parts of the gripper 20 and may therefore reduce the cost. In some embodiments and for at least some applications, this may also facilitates removal of these parts for cleaning or replacement when required. Since assistive robot arms are frequently exposed to numerous conditions and elements that may damage or cause deterioration of parts of assistive robot arms, having an ability to easily un-assemble and re-assemble exposed parts of the gripper 20 may offer a practical solution to a user thereof when such parts need to be cleaned, washed or even replaced. In another embodiment, the palm 21 and the covers 23, 24 may be interconnected or connected to the support 22 and/or base 25 by fasteners.

Figure 6:
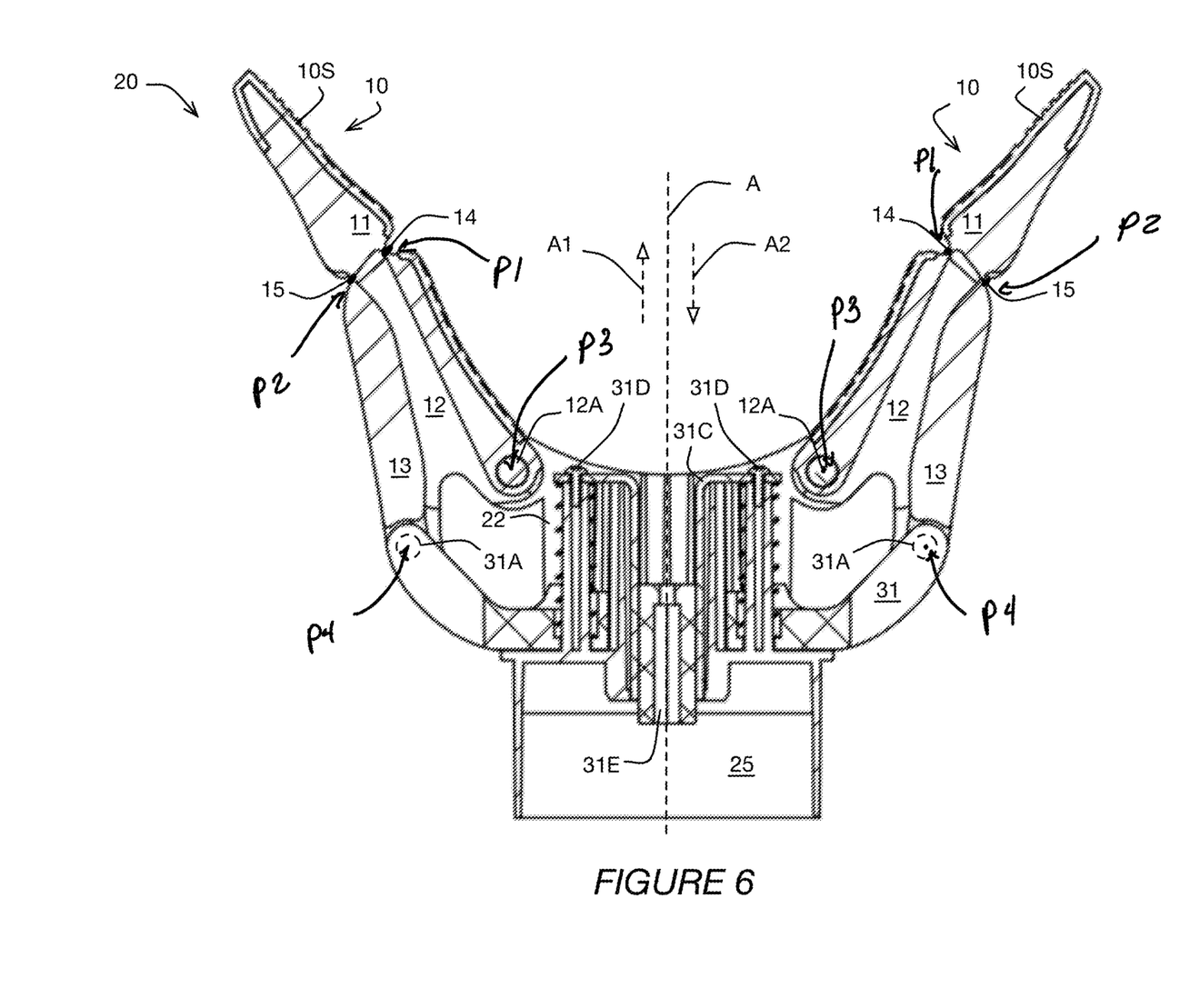
FIG. 6 is a cross-sectional view of the gripper of the mechanical arm of FIG. 1.

Now referring to FIGS. 5 and 6, the support 22 of the gripper 20 defines a receptacle 26 therein, which is covered by the palm 21 when the gripper 20 is assembled. More specifically, the support 22 has two opposed walls 22B; the receptacle 26 located between the two opposed walls 22B. The receptacle 26 at least partially receives therein a slider 31, biasing members, such as compression springs 31B, a guide 31C, and fasteners 31D (e.g., two screws 31D). The slider 31 slidably receives the guide 31C therein to translate back and forth along directions A1 and A2 along the symmetry plane A of the gripper 20 as shown in FIG. 6. In this embodiment, the guide 31C includes two L-shaped guide plates 31C1 or strips received through corresponding apertures in the slider 31.

The L-shaped guide plates 31C1 are secured to the support 22 at their respective shorter orthogonal portions via the respective fasteners 31D. The L-shaped guide plates 31C1 thereby define a forward limit position of a movement range of the slider 31 closest to the palm 21, and hold the slider 31 captive within the support 22 between the inner surface of the support 22 defining the receptacle 26 and the shorter orthogonal portions of the L-shaped guide plates 31C1 of the guide 31C.

A part of the inner surface of the support 22 that may define the receptacle 26 defines a rearward limit position of the sliding range of the slider 31 farthest from the palm 21. It is contemplated that a different linear sliding arrangement may be used. For example, a different arrangement may include a different number and/or type of the springs 31B and/or the guide 31C, etc. As another example, the L-shaped guide plates 31C1 may instead be a different number and/or shape of members providing a similar functionality as the L-shaped guide plates.

As best shown in FIG. 6, the slider 31 defines a threaded aperture 31E through a central portion thereof, such that a central axis of the aperture 31E lies in the symmetry plane A. Referring back to FIG. 2, an endless screw shaft or shank 32 of an actuator 30 is threaded and is at one end threadingly engaged to the threaded aperture 31E of the slider 31. The shaft 32 is at another end received through a central axis of a motor 33 (e.g., bidirectional motor) and threadingly engaged to a nut 34 of the actuator 30. The motor 33 is drivingly engaged to the shaft 32. In some embodiments, the motor 33 is a stepper motor. However, other types of motor 33 with corresponding controls may also be used. In the embodiment shown, the nut 34 is secured to the shaft 32 such that the nut 34 and the shaft 32 do not rotate one relative to the other.

This arrangement is selected such that when the motor 33 is driven in a given direction, the motor 33 rotates the endless screw shaft 32 about a rotation axis R in a corresponding direction and thereby axially slides the slider 31 along the rotation axis R forward A1. Conversely, when the motor 33 is driven in an opposite direction and thus rotates the endless screw shaft 32 in a corresponding opposite direction, the slider 31 slides backward A2.

Figure 3A:
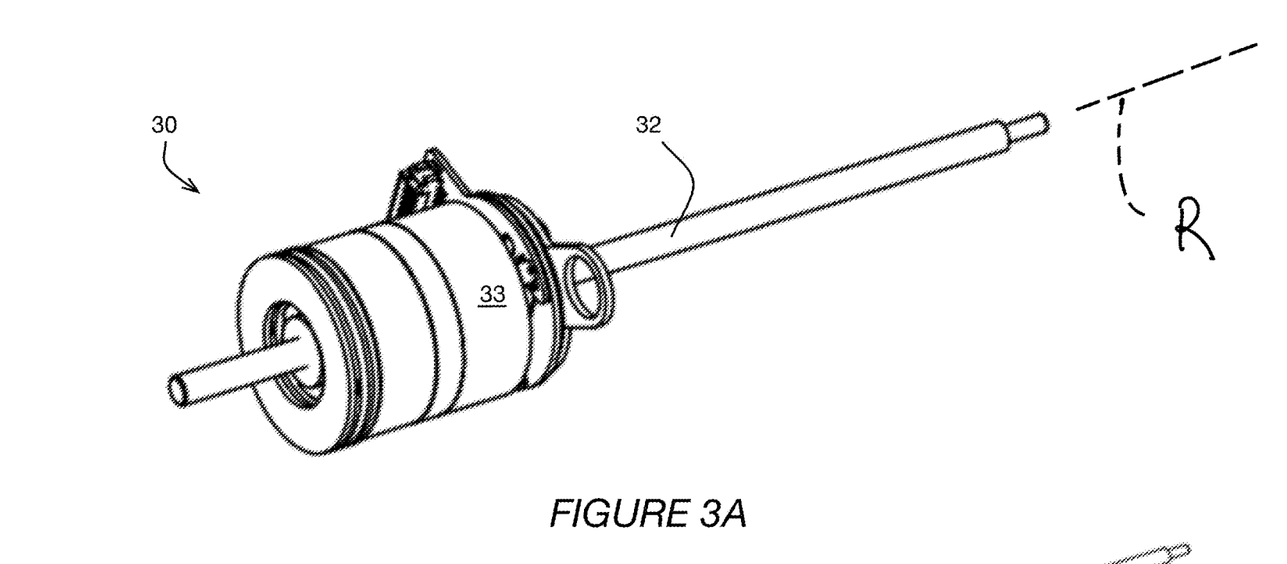
FIG. 3A is a three dimensional view of an actuator of the mechanical arm of FIG. 1 in according to one embodiment.
Figure 3B:
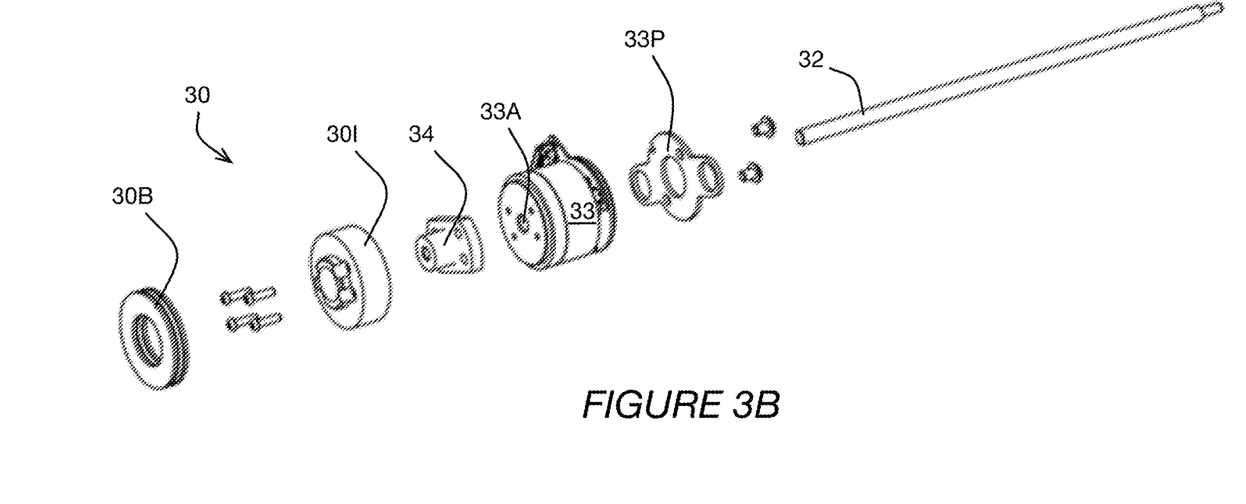
FIG. 3B is a three dimensional exploded view of the actuator of FIG. 3A.

To this end, with reference to FIGS. 2, 3A and 3B, the shaft 32 is received through a central aperture 33A of the motor 33 and is coupled to a rotor 33R (FIG. 2) of the motor 33 via its connection to the nut 34. The rotor 33R rotates the nut 34 and the nut 34 transfers torque from the rotor 33R to the shaft 32 to drive the shaft 32 in either direction as described above. The threaded connection between the shaft 32 and the slider 31 converts the rotation imparted to the shaft 32 into translational movement of the slider 31 relative to the support 22 as described above.

To help reduce vibration during operation, the motor 33 is fixed to the interior of the wrist 27 via a mounting plate 33P that in this embodiment is symmetric about the symmetry plane A. To facilitate rotation and help limit axial movement of the motor 33 and the shaft 32 along the symmetry plane A, the actuator 30 further includes a thrust bearing 30B and a bearing interface 30I. The bearing interface 30I is mounted over the nut 34 and abuts the thrust bearing 30B, which in turn abuts a corresponding inner wall of the rear end of the wrist 27, which inner wall is orthogonal to the symmetry plane A. While this arrangement and attachment provides a number of advantages, a different arrangement and/or attachment may likewise be used.

For example, it is contemplated that a different mechanism for providing the selective linear sliding movement of the slider 31 may be used. For example, a fixed coupling between the shaft 32 and the slider 31 may be used, wherein a threaded connection between the shaft 32 and the nut 34 (or other element driven by the motor 33), could be selected to convert rotation of the rotor 33R to linear motion of the slider 31. A pneumatic or hydraulic piston to provide for the linear actuation directly may also be used.

Referring to FIGS. 5 and 6, each of the skeleton members 13 of the fingers 10 is at its rear end 13R flexibly pivotably removably connected to a corresponding outer part of the slider 31 to be movable by the slider 31. In the embodiment shown, the slider 31 has two prongs 31P spaced apart from one another; each of the two skeleton members 13 of the fingers 10 is pivotably connected to a respective one of distal ends of the two prongs 31P. More particularly, the rear ends 13R of the skeleton members 13 define apertures therein which receive corresponding ones of pins 31A that extend from corresponding outer portions of the slider 31 and located at the distal ends of the two prongs 31P. Two pivot axes P4 are defined at the connections between the skeleton members 13 of the fingers 10 and the slider 31.

To allow the pins 31A located at the distal ends of the two prongs 31P to be inserted into or removed from the respective apertures in the rear ends 13R of the skeleton members 13, at least the rear ends 13R of the skeleton members 13 are made from a flexible material allowing for the rear ends 13R to be manually elastically bent away from each other. This arrangement facilitates assembly and disassembly of the gripper 20. However, another removable pivot connection and/or a different shape/construction of the slider 31 may be used, including a separate pivot making a pivot joint between the slider 31 and the skeleton members 13. As another example, the slider 31 may have moving parts which may provide for the functionality of the fingers 10 described herein.

In the present embodiment, when the gripper 20 is assembled and the slider 31 is moved forward A1 upon rotation of the shaft 32, the slider 31 applies a force via the pins 31A simultaneously to the rear ends 13R of both of the skeleton members 13. The skeleton members 13 transfer corresponding components of the force to the outer living hinges 15 of the fingers 10 and thereby create corresponding torques about the inner living hinges 14. The torques pivot the distal phalanges 11 relative to corresponding ones of the proximal phalanges 12 toward the symmetry plane A and about their inner pivot axes P1. The gripper 20 thereby starts to move toward a closed position. A pivoting of the distal phalanges 11 in a reverse direction relative to corresponding ones of the proximal phalanges 12, to cause the gripper 20 to move toward an open position, may be achieved by actuating the motor 33 to selectively pull the slider 31 backward A2. Possible movements of the gripper 20 are described in more detail next.

Figure 7:
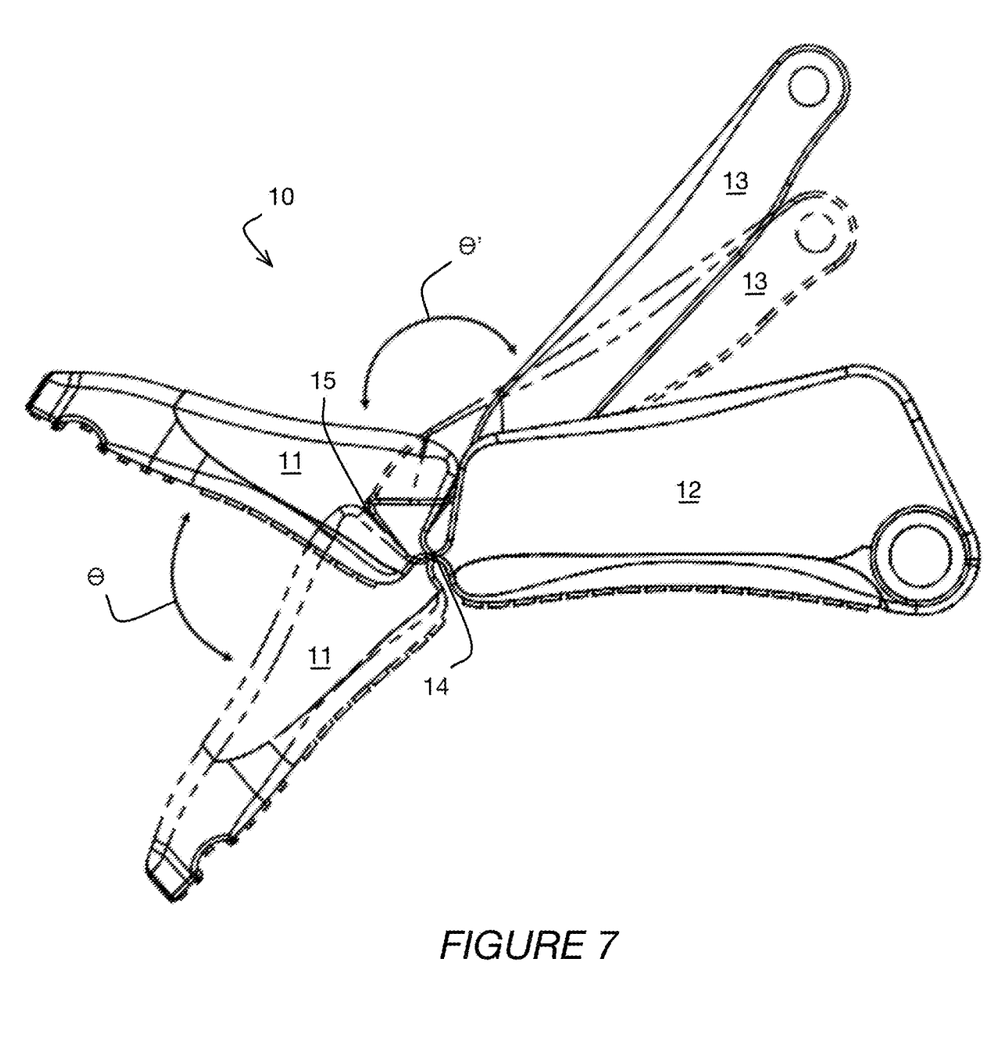
FIG. 7 is a side view of one of two fingers of the gripper of mechanical arm of FIG. 1 showing possible movements of the finger.
Figure 8A:
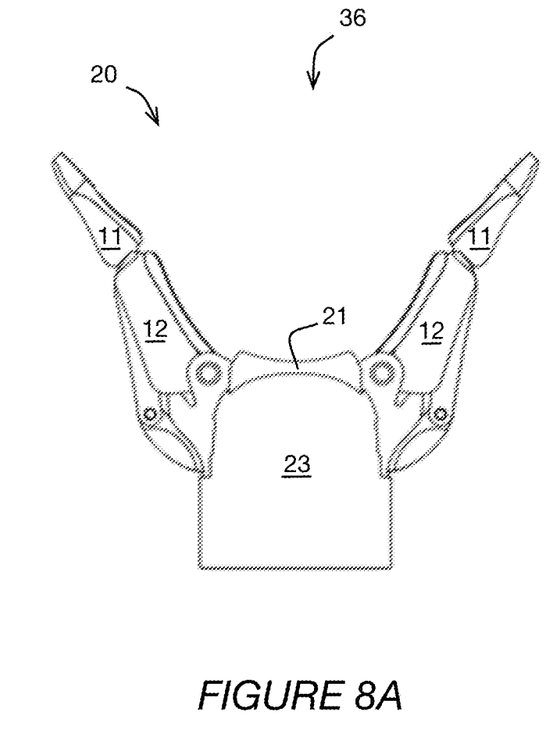
FIGS. 8A to 8C are side views of the gripper of mechanical arm of FIG. 1 showing a sequence of movements of the gripper from an open position to a pinching position.
Figure 8B:
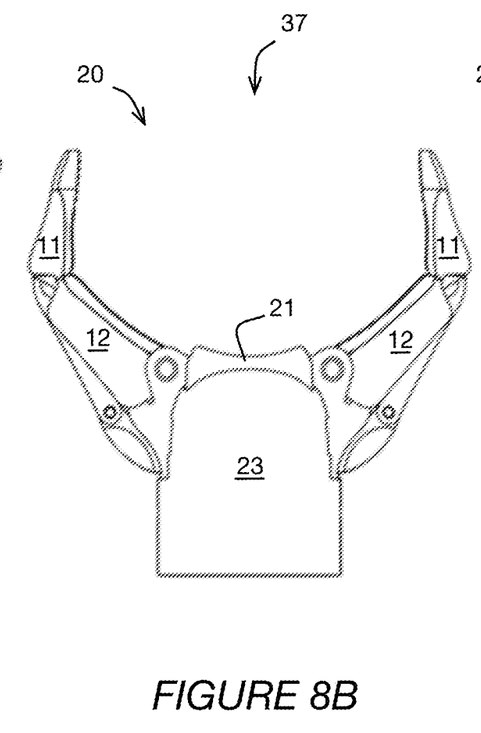
Figure 8C:
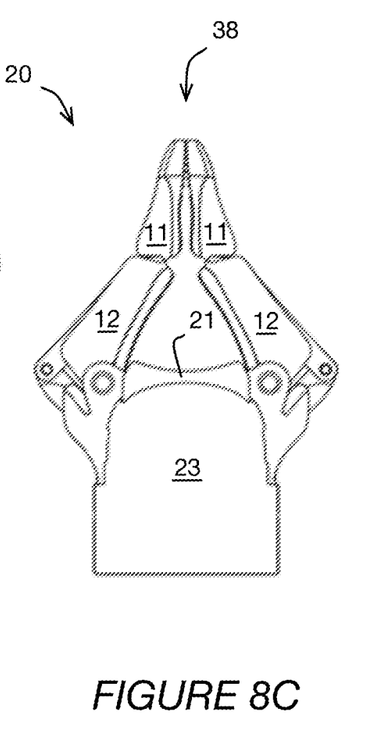

Now referring to FIG. 7, a range a of pivoting movement of one of the distal phalanges 11 that may be provided for by selectively sliding the slider 31 forward A1 and backward A2 is shown with a double-ended reference arrow, and with the proximal phalanx 12 remaining still in FIG. 7 for use as baseline reference to show an amplitude of movement of the distal phalanx 11, though it may move as shown in FIGS. 8A-8C. A corresponding range of movements of the skeleton members 13 is shown with a double-ended reference arrow 8'.

As shown, dimensions of the corresponding inner living hinge 14, including a width and length thereof, and the material(s) thereof, are selected to accommodate a desired magnitude of the pivoting movement range a of each given distal phalanx 11. The material(s) of the inner living hinges 14 and the outer living hinges 15 may be selected to provide for suitable resistance to fatigue failure in order to provide a desired life expectancy of the inner living hinges 14 and the outer living hinges 15. The shape, size, material selection of the living hinges 14 and/or 15 may be selected for the deformation to remain elastic throughout the range of motion.

The shape of the slider 31 and the skeleton members 13, and the positions of the inner and outer living hinges 14, 15 relative to each other, are selected to provide for a pinching closing movement of the gripper 20 illustrated with reference numerals 36, 37 and 38 in FIGS. 8A to 8C, and for a grasping closing movement of the gripper 20 illustrated with reference numerals 39, 40 and 41 in FIGS. 9A to 9C. In the illustrated embodiments, both pinching and grasping closing movement is a result of a single degree of actuation (i.e., the rotational output of the motor 33, or the translational output of the slider 31), whereby the gripper 20 may be said to be underactuated). Reference numerals 36 and 39 show open positions of the gripper 20. Reference numerals 37 and 40 show interim positions of the gripper 20. Reference numeral 38 shows a pinching position of the gripper 20. Reference numeral 41 shows a gripping position of the gripper 20.

Referring to FIGS. 8A to 8C, the pinching closing movement of the gripper 20 may be executed by driving the slider 31 forward A1 while nothing obstructs the pivoting movement of the proximal phalanges 12 relative to the support 22. More particularly, nothing obstructs the pivoting movement of the proximal phalanges 12, moving the slider 31 forward A1 from an open position 36 of the gripper 20 first causes the distal phalanges 11 to pivot toward the symmetry plane A about their inner pivot axes P1 (FIG. 6) as shown in FIG. 8B, and then causes the proximal phalanges 12 to pivot toward the symmetry plane A about the finger pivot axes P3 (FIG. 6). In some embodiments, to further improve this sequencing of movement, the inner living hinges 14 are made to provide less resistance to pivoting/rotation than the respective outer living hinges 15. The different pivoting/rotation resistance(s) are provided using suitably selected different materials and/or using accordingly different shape(s) and/or thickness(es) and/or width(s) of the living hinges 14, 15.

As the gripper 20 is being closed, the pivoting of the phalanges 11 and 12 toward the symmetry plane A continues until the distal phalanges 11 come in close proximity to press an object between them, or press against each other as shown in FIG. 8C if no object is present. At this point, the gripper 20 is in a closed pinching position 38, and further application of force by the actuator 30 to the slider 31 in the forward A1 direction increases a pinching force between the distal phalanges 11. The pinching action may allow the gripper 20 to pinch and/or secure and/or hold relatively small objects. The materials and construction of the gripper 20, and the type, size and power of the actuator 30, may be selected to suit each particular application of the gripper 20, such as to provide a particular pinching force capability required for a given application.

In other words, when the slider 31 is moved along direction A1, it pushes on the skeleton members 13 via the pins 31A. In turn, this pushes on the outer living hinges 15 thereby creating a moment about the inner living hinges 14 resulting in the distal phalanges 11 pivoting relative to the proximal phalanges 12 about the inner pivot axes P1. At some point, further movement of the slider along direction A1 results in the proximal phalanges 12 pivoting about the finger pivot axes P3. It will be appreciated that pushing on the skeleton members 13 via the movements of the slider 31 may simultaneously create moments at both of the inner pivot axes P1 and finger pivot axes P3. This may result in rotation of the proximal phalanges 12 relative to the support 22 occurring simultaneously as the rotation of the distal phalanges 11 relative to the proximal phalanges 12.

Figure 9A:
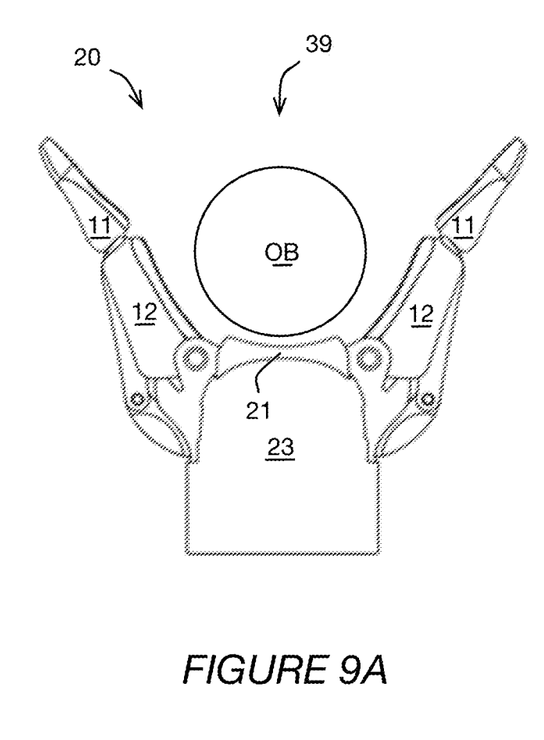
FIGS. 9A to 9C are side views of the gripper of mechanical arm of FIG. 1 showing a sequence of movements of the gripper from an open position to a gripping position.
Figure 9B:
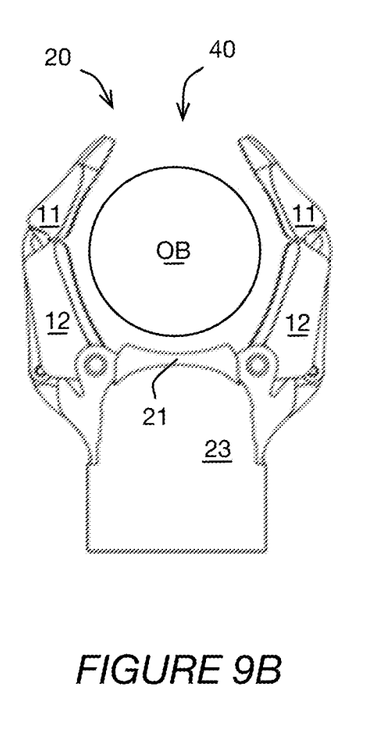
Figure 9C:
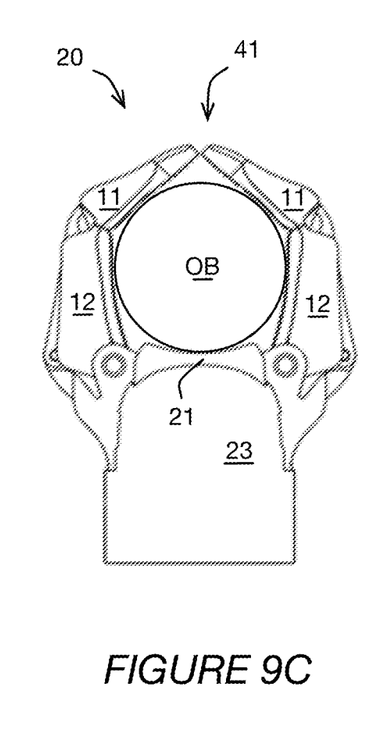

Referring to FIGS. 9A to 9C, the grasping closing movement of the gripper 20 may be executed by driving the slider 31 forward A1 while an object OB, such as a household item in prosthesis and technical-aid applications of the gripper 20 and/or the arm 1, obstructs the pivoting movement of the proximal phalanges 12 relative to the support 22. As shown by FIGS. 9A and 9B, the initial inward pivoting of the distal phalanges 11 (with the proximal phalanges 12 being stationary or at least pivoting inward slower than the distal phalanges 11) may allow the gripper 20 to at least partially enclose the object OB and may thereby help prevent the object OB from escaping the gripper's 20 grasp.

Referring to FIG. 9C, as the distal and proximal phalanges 11, 12 enclose and contact the object OB, further application of force in the same direction by the actuator 30 provides a gripping force between the phalanges 11, 12 and the object OB. In prosthesis and technical-aid applications of the gripper 20 and/or the arm 1, this may allow to grip and hold up or otherwise manipulate a household item for example. As shown, depending on the size of the object OB, the palm 21 may provide an additional contact surface and may therefore help provide a better grip of the object OB.

When the slider 31 is moved along direction A1, it pushes on the skeleton members 13 via the pins 31A. In turn, this pushes on the outer living hinges 15 thereby creating a moment about the inner living hinges 14 resulting in the distal phalanxes pivoting relative to the proximal phalanges 12 about the inner pivot axes P1. At some point, further rotation of the proximal phalanges 12 about the finger pivot axes P3 may be limited by the objet OB. Further movement of the slider along direction A1 results in the distal phalanges 11 pivoting about the inner pivot axes P1. This result in the two fingers 10 cooperating to at least partially surround the object OB. Again, it will be appreciated that pushing on the skeleton members 13 via the movements of the slider 31 may simultaneously create moments at both of the inner pivot axes P1 and finger pivot axes P3. This may result in rotation of the proximal phalanges 12 relative to the support 22 occurring simultaneously as the rotation of the distal phalanges 11 relative to the proximal phalanges 12 until the proximal phalanges 12 become in abutment against the object OB.

In the present embodiment, the actuator 30 of the gripper 20 is non-backdrivable, as provided by the threaded arrangement of the endless screw shaft 32 described above. This means that if power is lost, the slider 31 will remain in its last position. This enables the controller 44 to cut power to the actuator 30 once the object OB is grasped and until the fingers 10 need to be moved again. With this approach, the gripper 20 may have a reduced energy consumption compared to at least some prior art robotic arms of similar size and application.

In the present embodiment, the slider 31 compresses the springs 31B when actuated forward A1 to move the fingers 10 from an opened to a closed position. The compressed springs 31B bias the slider 31 to the rearward limit position of its sliding range, and help reduce a power output of the motor 33 required to move the slider 31 backward A2 to open the fingers 10. This helps reduce energy consumption of the gripper 20, and may help provide a lower energy consumption compared to at least some prior art robotic arms of similar size and application.

In other embodiments, the actuator 30 may be backdrivable. In such other embodiments, the springs 31B may return the gripper 20 to an open position 36, 39 when power is cut to the actuator 30. In some such embodiments, the linear slider mechanism described above may help reduce a likelihood of damage to the fingers 10 of the gripper 20. More particularly, in such embodiments, if a finger 10 is accidentally hit on its exterior surface, that finger 10 may transfer at least some of the force into the spring(s) 31B of the linear slider mechanism. The spring(s) 31B may absorb at least some of the force and may thereby reduce a magnitude of force which may otherwise go into deforming the finger 10 for example. Once the external force is removed, the spring(s) 31B may return to their pre-impact position.

Referring back to FIG. 2, in the present embodiment, operation of the motor 33, and hence actuation and movements of the slider 31 and fingers 10 as described above, is controlled by a controller 44 that is operatively connected to the motor 33 via a suitable electrical connection. The controller 44 is a printed circuit board (PCB), but could likewise be any other suitable controller suitable to operate each given embodiment of the gripper 20 as described in this document. The controller 44 may also be remote to the mechanical arm 1 in cases where the mechanical arm 1 is incorporated into a robotic structure for example. In some such embodiments, one or more controllers of the robotic structure or other system into which the mechanical arm 1 is incorporated, may be used to operate the motor 33 instead of the controller 44. In some such cases, the controller 44 may be omitted.

As shown, in the present embodiment, the controller 44 is manufactured to be generally circular and to fit into a respective generally circular end portion 46 of the wrist 27, opposite the gripper 20. Further as shown, both the controller 44 and the generally circular end portion 46 define an aperture therethrough which is generally orthogonal to the shaft 32 and serves as a pivoting connection point of the wrist 27 to a suitable larger mechanical structure such as a robotic arm. In some cases, such a connection point facilitates integration of the arm 1 into a suitable larger mechanical structure.

Further as best shown in FIG. 2, the motor 33 and the controller 44 are both disposed in the wrist 27, at locations that are remote from the gripper 20. Only half of the wrist 27 structure is shown in FIG. 2, to better show these respective locations. More particularly, in the present embodiment, both of the locations are disposed in a distal half of the wrist 27, and, stated otherwise, more than half way toward the rear end of the wrist 27 relative to a length thereof. In some embodiments and applications, such positioning may help reduce a likelihood of contaminants, such as water and dust, reaching the motor 33 and the controller 44 while the gripper 20 is in use. For example, in case of a leak at the front end of the wrist 27, a likelihood that the leak will reach the rear end of the wrist 27 that houses the motor 33 and the controller 44 is lower than a likelihood of the leak reaching locations that are closer than the half-way point between the ends of the wrist 27.

The wrist 27 may be made using any suitable structure and materials. However, in a preferred embodiment, the wrist 27 may be constructed such that the space therein that receives the motor 33 and the controller 44 is substantially impermeable to liquids and/or dust for at least a predetermined period after exposure. In one aspect, the construction of the linear actuator 30 described above having the shaft 32 helps make it easier to construct the wrist 27 to be impermeable to liquids, dust, and other contaminants by reducing a number of apertures required to be made in the wrist 27 in comparison with at least some prior art mechanical arms, and hence by reducing the number of apertures to be sealed.

For example, in one aspect, in some embodiments, the wrist 27 may define a single aperture/opening in the front end thereof, for passing the shaft 32 therethrough. Accordingly, only one sealing arrangement may be required for the single aperture. Understandably, in other cases multiple apertures may be used to facilitate assembly for example. Also, in some embodiments, the base 25 and the wrist 27 may be integral with each other. As another example, in another aspect, the remote motor 33 and controller 44 arrangement allows the gripper 20, and more particularly the fingers 10, the support 22, and the base 25, to be free from electronics. An electronics-free arrangement of the gripper 20 may allow the gripper 20 to be relatively more resistant to at least some environments and/or contaminants in which it may be used.

In the present embodiment, the actuator 30 and the controller 44 are powered by a suitable electric power source (not shown) to operate the gripper 20 as described. In some embodiments, the power source, such as one or more batteries, is disposed inside the wrist 27, while in other embodiments the power source is a remote power source. The actuator 30 is an example of an actuator that may be used. In an embodiment, the shaft 32 and motor 33 are part of an off-the-shelf device, such as a ballscrew actuator, etc. In other embodiments, the linear actuator 30 may be a different type of linear actuator, such as a pneumatic or a hydraulic actuator for example. Understandably, in embodiments in which other actuator(s) 30 are used, the power source may be of a different type corresponding to the different actuator(s) 30 (e.g. a compressed air source for pneumatic actuator(s)).

Although the gripper 20 is suited for prosthesis and technical-aid applications, they may be used for any other appropriate application. For instance, robots or manipulators may be equipped with the mechanical arm 1 and/or the gripper 20 in white-room applications, to manipulate chemicals. This is just one other example application among numerous others. To this end, the finger(s) 10 and/or the palm 21 of the gripper 20 may be fabricated with inner contact surface(s) having specific texture(s) to enable adequate handling of objects in each particular application.

As seen from the description above, the gripper 20 of the present technology is operable via a single actuator 30 operating in a single plane of symmetry A. In at least some applications, this configuration may provide improved operating characteristics and may be cheaper to manufacture relative to at least some prior art robotic arms of a similar size and intended for the same application(s). In some embodiments, the gripper 20 may use multiple actuators 30, at least one of which may be disposed and/or may operate out of the plane of symmetry A. Such embodiments may be employed, for example, in applications where relatively larger gripping forces may be required.

Further, as from the description above, each finger of the gripper 20 includes two phalanges 11 and 12. It is contemplated that in some embodiments and/or for some applications, one or more of the finger(s) 10 may include additional phalanges. In some such embodiments, the proximal phalanx 12 of a given finger 10 may be attached to a third phalanx (not shown) for example, and the given finger 10 may connect to the support 22 via the third phalanx instead of via the proximal phalanx 12.

The features of the fingers 10 as described above allow each of the fingers 10 to be manufactured as a single solid piece using one or more suitable materials and using a suitable manufacturing technique such as injection molding or 3D printing for example. For at least some applications, this approach reduces costs and/or enables the finger(s) 10 to withstand various weather conditions and remain functional even after being exposed to some contaminants that may render inoperable or otherwise negatively affect at least some prior art robotic arms. Even if in preferred embodiments each of the fingers 10 are fabricated in one solid piece, it is still possible to have one or more of the fingers 10 made of more than one piece.

Further, it will be appreciated that for each particular embodiment and application of the gripper 20, the various parts (such as the phalanges) thereof could be made by a skilled person in the art choosing known materials that would be known to the skilled person to suit each particular the embodiment and application. For example, in some cases, the phalanges 11, 12 and the slider 31 may be made relatively more rigid than the living hinges 15 to provide for the functionality described in this document. In a particular example, the structural portion of the finger(s) 10 may be made from ThermoPlastic Copolyester (TPC) (ARNITEL EL550)™. In some embodiments, the structural portion of the finger(s) 10 may be made of interconnected walls/members that are in a range from 1.5 mm to 2.5 mm, and in one particular example, 2 mm. In some such embodiments, the living hinge(s) 15 may have a thickness of 0.5 mm to 1.3 mm, and in one particular example, 0.8 mm. In some such embodiments, the contact surface(s) of the finger(s) 10 may be made from Thermoplastic Elastomer (TPEs) (VERSAFLEX OM1245X-1)™. In some embodiments, the contact surface(s) 10S of the finger(s) 10 may be in a range of 1 mm to 3 mm thickness, and in one particular example, 1.5 mm.

Although the arm 1 and its components may be made using any suitable materials and manufacturing methods, making the fingers 10 from a polymeric material facilitates easy removal thereof from the support 22 to be cleaned, washed or replaced. In some embodiments for example, one or more of the fingers 10 is made from a metallic material. In some embodiments for example, one or more of the fingers 10 is made by 3D printing.

For example, contact surfaces 10S (FIG. 6) of the fingers 10 may be manufactured with an overmold technique if the fingers 10 are fabricated using injection molding. As another non-limiting example, a multi-material 3D printing technique may be used to make both the finger(s) 10 and the contact surfaces thereof. Contact surfaces 10S (FIG. 6) may be made to extend around the fingertip of each finger 10 as shown in FIG. 6, to provide an improved attachment between the overmold material and the finger material. As shown in FIG. 6, the overmold material may include internal links attaching the overmold material to the finger material near the tip of the finger. In a particular example, the contact surfaces 10S may be mechanically mounted over the corresponding finger(s) 10.

The embodiments and variations described above and illustrated are intended to be non-limiting examples only. Other variations and modifications, such as embodiments in which the fingers 10 are movable parallel to each other, are possible without departing from the present technology. For example, while in the illustrated embodiments the base 25 fixedly connects to the wrist 27, in other embodiments, the base 25 and thus the gripper 20 may be movably connected to the wrist 27, for example to be rotatable or pivotable relative to the wrist 27. As another example, the actuating mechanism described herein may be used to actuate a different type of gripper than the gripper 20 described in this document.

Embodiments disclosed herein include:

A. A mechanical finger for a mechanical hand, comprising: a proximal phalanx pivotably mountable to a support of the mechanical hand to pivot relative to the support about a finger pivot axis; a distal phalanx pivotably connected to the proximal phalanx via a first living hinge to pivot relative to the proximal phalanx about a first pivot axis; and a skeleton member pivotably connected at one end to the distal phalanx via a second living hinge to pivot relative to the distal phalanx about a second pivot axis offset from the first pivot axis and at another end operatively connected to an actuator of the mechanical hand to be selectively movable by the actuator to pivot the distal phalanx relative to the proximal phalanx and to pivot the distal phalanx relative to the support when the finger is in use.

B. A mechanical gripper comprising: a support; at least one mechanical finger movable relative to the support from an open position to a closed position, the at least one mechanical finger having a proximal phalanx pivotably mounted to the support about a finger pivot axis, a distal phalanx pivotably connected to the proximal phalanx via a first hinge, and a skeleton member pivotably connected at a first end to the distal phalanx via a second hinge offset from the first hinge; and an actuator operatively connected to a second opposite end of the skeleton member, movement of the second opposite end of the skeleton member by the actuator in a direction being transverse to the finger pivot axis moving the mechanical finger between the open position and the closed position.

Embodiments A and B may include any of the following elements, in any combinations:

Element 1: the first living hinge is monolithic with at least a part of each of the proximal and distal phalanges and/or the second living hinge is monolithic with at least a part of each of the distal phalanx and the skeleton member. Element 2: the proximal phalanx, the distal phalanx, the first living hinge and the second living hinge are constructed with from a polymeric material. Element 3: the proximal phalanx, the distal phalanx, the first living hinge and the second living hinge are monolithic to each other. Element 4: the first and second living hinges are defined by portions of the finger having reduced thicknesses compared to that of the proximal phalanx and the distal phalanx. Element 5: the first pivot axis is parallel to the second pivot axis. Element 6: the skeleton member and the second living hinge are located on an outer side of the proximal phalanx opposite an inner side, the inner side configured to hold an object. Element 7: the first living hinge has a different rotation resistance than that of the second living hinge. Element 8: the actuator includes an electric motor. Element 9: the electric motor is operatively connected to a controller disposed in a wrist portion. Element 10: the actuator is connected to the skeleton member via a slider movable relative to the support, the actuator including an electric motor drivingly engaged to a threaded shaft, the threaded shaft threadingly engaged into a correspondingly threaded aperture of the slider, rotation of the threaded shaft about a rotation axis thereof translating into an axial displacement along the rotation axis of the slider relative to the support. Element 11: a guide secured to the support, the slider movable along the guide. Element 12: at least one biasing member between the support and the guide to bias the support in a position corresponding to the open position of the at least one mechanical finger. Element 13: the first hinge is monolithic with at least a part of each of the proximal and distal phalanges. Element 14: the at least one finger is underactuated. Element 15: the proximal phalanx, the distal phalanx, the first hinge and the second hinge are monolithic to each other, the first hinge and the second hinge being living hinges. Element 16: the at least one mechanical finger includes two mechanical fingers. Element 17: movements of the two mechanical fingers between the open position and the closed position are symmetrical. Element 18: the at least one mechanical finger is releasably attached to the support.

As can be seen therefore, the examples described above and illustrated are intended to be exemplary only. The scope is indicated by the appended claims.

What is claimed is:

1. A mechanical finger for a mechanical hand, comprising: a proximal phalanx directly pivotably mountable to a support of the mechanical hand to pivot relative to the support about a finger pivot axis at a proximal end of the proximal phalanx; a distal phalanx pivotably connected to the proximal phalanx at a distal end of the proximal phalanx via a first living hinge to pivot relative to the proximal phalanx about a first pivot axis; and a skeleton member pivotably connected at one end to the distal phalanx via a second living hinge to pivot relative to the distal phalanx about a second pivot axis offset from the first pivot axis and at another end operatively connected to an actuator of the mechanical hand to be selectively movable by the actuator to pivot the distal phalanx relative to the proximal phalanx and to pivot the distal phalanx relative to the support when the finger is in use.

2. The mechanical finger of claim 1, wherein the first living hinge is monolithic with at least a part of each of the proximal and distal phalanges and/or the second living hinge is monolithic with at least a part of each of the distal phalanx and the skeleton member.

3. The mechanical finger of claim 1, wherein the proximal phalanx, the distal phalanx, the first living hinge and the second living hinge are constructed with from a polymeric material.

4. The mechanical finger of claim 1, wherein the proximal phalanx, the distal phalanx, the first living hinge and the second living hinge are monolithic to each other.

5. The mechanical finger of claim 1, wherein the first and second living hinges are defined by portions of the finger having reduced thicknesses compared to that of the proximal phalanx and the distal phalanx.

6. The mechanical finger of claim 1, wherein the first pivot axis is parallel to the second pivot axis.

7. The mechanical finger of claim 6, wherein the skeleton member and the second living hinge are located on an outer side of the proximal phalanx opposite an inner side, the inner side configured to hold an object.

8. The mechanical finger of claim 1, wherein the first living hinge has a different rotation resistance than that of the second living hinge.

9. A mechanical gripper comprising: the support; at least one mechanical finger according to claim 1, the at least one mechanical finger movable relative to the support from an open position to a closed position; and the actuator operatively connected to a second opposite end of the skeleton member, movement of the second opposite end of the skeleton member by the actuator in a direction being transverse to the finger pivot axis moving the mechanical finger between the open position and the closed position.

10. The mechanical gripper of claim 9, wherein the actuator includes an electric motor.

11. The mechanical gripper of claim 10, wherein the electric motor is operatively connected to a controller disposed in a wrist portion.

12. The mechanical gripper of claim 9, wherein the actuator is connected to the skeleton member via a slider movable relative to the support, the actuator including an electric motor drivingly engaged to a threaded shaft, the threaded shaft threadingly engaged into a correspondingly threaded aperture of the slider, rotation of the threaded shaft about a rotation axis thereof translating into an axial displacement along the rotation axis of the slider relative to the support.

13. The mechanical gripper of claim 12, comprising a guide secured to the support, the slider movable along the guide.

14. The mechanical gripper of claim 13, comprising at least one biasing member between the support and the guide to bias the support in a position corresponding to the open position of the at least one mechanical finger.

15. The mechanical gripper of claim 9, wherein the first hinge is monolithic with at least a part of each of the proximal and distal phalanges.

16. The mechanical gripper of claim 9, wherein the at least one finger is underactuated.

17. The mechanical gripper of claim 9, wherein the proximal phalanx, the distal phalanx, the first hinge and the second hinge are monolithic to each other, the first hinge and the second hinge being living hinges.

18. The mechanical gripper of claim 9, wherein the at least one mechanical finger includes two mechanical fingers.

19. The mechanical gripper of claim 18, wherein movements of the two mechanical fingers between the open position and the closed position are symmetrical.

20. A mechanical finger fora mechanical hand, comprising:
a proximal phalanx directly pivotably mountable to a support of the mechanical hand to pivot relative to the support about a finger pivot axis at a proximal end of the proximal phalanx;
a distal phalanx pivotably connected to the proximal phalanx at a distal end of the proximal phalanx via a first living hinge to pivot relative to the proximal phalanx about a first pivot axis; and
a skeleton member pivotably connected at one end to the distal phalanx via a second living hinge to pivot relative to the distal phalanx about a second pivot axis offset from the first pivot axis and at another end operatively connected to an actuator of the mechanical hand by at least a skeleton pivot axis at the other end to be selectively movable by the actuator to pivot the distal phalanx relative to the proximal phalanx and to pivot the distal phalanx relative to the support when the finger is in use, wherein the skeleton pivot axis and the finger pivot axis move relative to one another when the finger is actuated.

* * * * *